US005725758A

United States Patent [19]
Chace et al.

[11] Patent Number: 5,725,758
[45] Date of Patent: Mar. 10, 1998

[54] FILTRATION SYSTEM AND ASSEMBLY

[75] Inventors: Allan S. Chace, Worthington, Ohio; Karl C. Huff, Chicago, Ill.

[73] Assignee: Water Refining Inc., Worthington, Ohio

[21] Appl. No.: 697,336

[22] Filed: Aug. 22, 1996

[51] Int. Cl.$^6$ ............................ B01D 35/00; B01D 15/00
[52] U.S. Cl. .............. 210/85; 210/93; 210/321.66; 210/195.2; 210/257.2; 210/134; 210/136
[58] Field of Search ................ 210/321.6, 321.66, 210/195.2, 257.2, 416.1, 97, 101, 130, 87, 91, 134, 136, 93, 85; 417/89, 201

[56] References Cited

U.S. PATENT DOCUMENTS

| | | | |
|---|---|---|---|
| 3,856,676 | 12/1974 | Grimme, Jr. et al. | 210/252.2 |
| 4,026,800 | 5/1977 | Friedrick et al. | 210/87 |
| 4,172,033 | 10/1979 | Willock | 210/91 |
| 4,366,051 | 12/1982 | Fischel | 210/134 |
| 4,411,781 | 10/1983 | Schnabel et al. | 210/416.1 |
| 4,498,892 | 2/1985 | Skinner | 210/416.1 |
| 4,680,109 | 7/1987 | Yamada et al. | 210/416.1 |
| 5,075,002 | 12/1991 | Thalmann et al. | 210/257.2 |
| 5,395,514 | 3/1995 | Siegler | 210/85 |
| 5,503,735 | 4/1996 | Vinas et al. | 210/134 |

*Primary Examiner*—Ana Fortuna

[57] ABSTRACT

A filtration system and assembly for liquid mixture applications is disclosed. The system comprise of a pump, filter, venturi, and by-pass that incorporates a flow control valve. The flow control valve controls the flow and pressure of the retentate thereby determining the rate that permeate is produced. All components are configured in a closed loop configuration. System stability and high permeate flow result from the optimum selection of system components. The disclosed system has a simpler control system and is easier to operate than similar functioning systems in use. Applications exist in microfiltration, ultrafiltration, and nanofiltration.

12 Claims, 3 Drawing Sheets

1

FILTRATION SYSTEM AND ASSEMBLY

BACKGROUND

1. Field of the Invention

This invention relates to an easy to control and inexpensive system and assembly for the separation of liquid mixtures in a continuous, closed loop, filtration system for a wide variety of applications in nanofiltration, ultrafiltration and microfiltration.

2. Discussion of Prior Art

Liquid mixtures produced by various industrial or natural processes frequently contain small and large molecules as well as particles of varying size. Filtration is often used to separate liquid mixtures such as wastewater into two components, one having only molecules and particles small enough to pass thorough the filter, while the other component contains initial feedstock plus residual molecules and particles too large to pass through the filter.

In the most restrictive microfiltration applications, pores in the filter are small enough to prevent particles larger than about 0.1 micron from passing through the filter, while liquid containing smaller particles and molecules readily passes through the filter. The median pores size for microfilters is 1 micron. The pressures required to force a liquid mixture through the pours in the membrane are dependent upon the particular application. The static pressure for most commercial scale microfiltration applications is about 20 psig or greater. Applications of microfiltration include clarification of fruit juices, and the removal of emulsified oil from waste streams.

Ultrafiltration applications require a smaller pour size in the membrane and therefore increased pressure when compared to microfiltration. Minimal static pressures for many commercial ultrafiltration projects start at about 40 psig. Particles and molecules in the range from about 10,000 to 300,000 daltons and smaller can be separated from a feedstock using ultrafiltration. Applications include the removal of indigo dye and textile sizing from waste waters.

Nanofilters have a still smaller cutoff. However, the pour structure in nanofilters is larger than used in the well known reverse osmosis where applications include recovery of drinking water from sea water. The molecular weight cutoff for nanofiltration applications ranges from about 100 to 10,000 daltons. Minimal static pressures for commercial scale nanofiltration applications begin in the neighborhood of 60 psig. The removal of sugars from a liquid mixture and the separation of petrochemical products with similar boiling points are examples of nanofiltration application.

Within the above applications flow of a liquid mixture are produced at the surface of a filter. Cross flow filters have a component of the total flow along the surface of the filter. Flow along the filter surface helps keep the filter clean.

That portion of the liquid mixture which is forced through the filter is referred to as permeate. The remaining portion of the liquid in the filtration system which does not pass through the filter is referred to as retentate. The retentate contains molecules and particles too large to pass through the filter plus residual feedstock. Once removed from the filtration system, the retentate becomes known as concentrate.

Microfiltration, ultrafiltration, and nanofiltration systems are configured for batch or continuous processing of a liquid mixture feedstock. FIG. 1 illustrates a commonly used batch mode process. Referring to this figure a feedstock is removed from a sump tank 10B by a pump 12B and flows under pressure to a filter 14B. The permeate which flows through the filter drains to a permeate collection tank 16B. The retentate that remains in the system is expelled to a concentrate collection tank 18B and so becomes the feedstock for the next pass through the filtration system.

Many filtration applications require continuous processing of the feedstock rather than sequentially cycling batches of feedstock. FIG. 2 is a flow diagram for a typical continuous filtration system currently in use. As shown feedstock is removed from a sump tank 10C by a pump for feedstock 12F. The pump for feedstock 12F pressurizes the feedstock so that it is forced to combine with and become part of the retentate. The retentate is continually recirculated in the closed loop 20C by a pump for recirculation 12R. After flowing through the filter 14C the permeate flows to a permeate collection tank 16C. Retentate is removed from the closed loop 20C through a flow control valve for concentrate 22C. A concentrate collection tank 18C collects the concentrate removed from the filtration system.

Both batch and continuous filtration systems, as illustrated in FIG. 1 and FIG. 2, typically depend upon centrifugal pumps to move liquid through the filter system. A filtration system that uses cross flow filters in microfiltration, ultrafiltration and nanofiltration applications require static pressure from 20 to 200 psig at near constant flow. Regenerative turbine pumps can easily operate from 0 to 300 psig or more with reasonable power consumption at reasonably constant flows. Without expensive custom design a single centrifugal pump cannot provide this type of service although centrifugal pumps have many advantages in general industrial use.

It is frequently desirable to control the pressure and flow of the retentate in filtration systems. In U.S. Pat. No. 5,075,002 by Thalmann et al, the flow of fluid along the filter was controlled by incorporating a flow restricting orifice in the system beyond the filter, which created a back pressure in the system. The patent by Thalmann used a spiral wound membrane as a filter operating in the ultrafiltration domain with a centrifugal pump.

In U.S. Pat. No. 5,395,514 Thomas Siegler extended Thalmann's patent. He used an educator as a restriction to increase pressure at the filter and also pull feedstock into the partially closed loop. Siegler's patent is only for batch mode processing. Other than changing the pump or impeller design or orifice, Siegler's patent does not consider a stable means of changing or controlling the operational pressure or flow of the retentate at the filter within the loop that recycles the retentate.

Conventional continuous filtration systems as shown in FIG. 2 require two pumps to achieve the pressures and flow necessary to generate a high yield of permeate. These two pumps may need to be simultaneously controlled to achieve best performance. Control systems are often used to regulate and coordinate the output for each pump.

OBJECTS AND ADVANTAGES

Besides the objects and advantages of filtration systems described above, several objects and advantages of the present invention are:

(a) to provide an object capable of continuous, closed loop filtration of liquid mixtures that requires only a single pump rather then the more costly 2 pump state of the art system.

(b) to provide an object capable of continuous, closed loop filtration for liquid mixtures which is less expensive to control than the current 2 pump state of the art system.

(c) to provide an object capable of continuous, closed loop filtration for liquid mixtures which is easier for an operator to control than the current 2 pump state of the art system.

(d) to provide an object capable of continuous closed loop filtration for liquid mixture applications for use in microfiltration, ultrafiltration and nanofiltration with minimal change in system component characteristics as is required in current systems.

Still further objects and advantages will become apparent from a consideration of the ensuing description and drawings.

BRIEF DESCRIPTION OF THE DRAWINGS

The nature and mode of operation of the present invention will now be more fully described in the following detailed description taken with the accompany drawings within.

REFERENCE NUMERALS IN DRAWINGS

Figure 1:
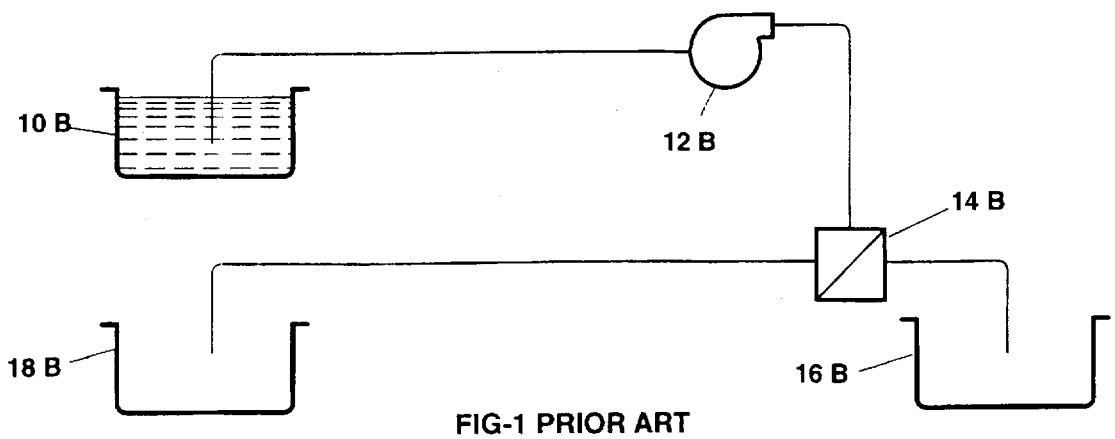
FIG. 1 is a flow diagram showing the flow of a liquid mixture through a typical batch mode filtration unit.

In the drawings, similar components used in different system configurations have the same first two numbers but different alphabetic suffices.

10B sump tank (batch system)
10C sump tank (continuous system)
10I sump tank (invention)
12B pump (batch system)
12F pump for feedstock (continuos system)
12R pump for recirculation (continuous system)
12I pump (invention, all pump designs)
12G pump (invention, regenerative turbine design)
14B filter (batch system)
14C filter (continuous system)
14I filter (invention, all filter designs)
14T filter (invention, tubular cross flow design)
16B permeate collection tank (batch system)
16C permeate collection tank (continuous system)
16I permeate collection tank (invention)
18B concentrate collection tank (batch system)
18C concentrate collection tank (continuous system)
18I concentrate collection tank (invention)
20C closed loop (continuous system)
20I closed loop (invention)
22C flow control valve for concentrate (continuous system)
22I flow control valve for concentrate (invention)
24I flow control valve for retentate (invention, manual)
26I venturi (invention)
28I port for feedstock (invention)
30I port for concentrate (invention)
32I port for permeate (invention)
34I filter module (invention)
36I motor (invention)
38I on-off switch (invention)
40I timer to close solenoid valve (invention)
42I timer to open solenoid valve (invention)
44I pressure gauge (invention)
46I steel framework (invention)
48I cross section of filter module (invention)
50I end plate (invention)
52I membrane gasket (invention)
54I counter plate (invention)
56I flange gasket (invention)
58I upper flange (invention)
60I lower flange (invention)

DESCRIPTION OF THE PREFERRED EMBODIMENT

Figure 3:
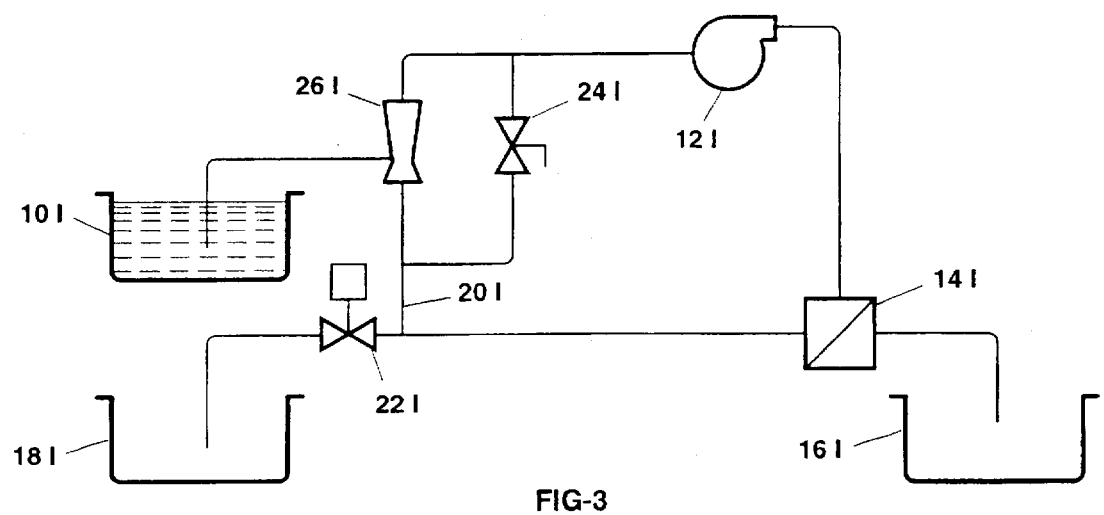
FIG. 3 is a flow diagram showing the flow of a liquid mixture through the continuous mode filtration unit of the invention.

FIG. 3 is a flow diagram showing the flow within the disclosed invention. A single pump 12I circulates retentate around a closed loop 20I. Within this closed loop 20I the retentate flow is divided into two components. One component flows through the venturi 26I, sometimes called an educator, aspirator or ejector. The remaining by-pass component flows through a manually operated flow control valve for retentate 24I. The flow through the venturi 26I is therefore controlled by a flow through the manual operated flow control valve for retentate 24I. The venturi 26I continually sucks (or pulls) feedstock from the sump tank 10I into the closed loop 20I. The pressure and flow at the filter 14I within the closed loop 20I is controlled by opening or closing the manual operated flow control valve for retentate 24I to create a back pressure at the filter 14I. The concentration of the retentate is regulated by periodic blow down of retentate by opening the flow control valve for concentrate 22I. The concentrate is removed to the concentrate collection tank 18I. The permeate that passes through the filter 14I is drained to the permeate collection tank 16I.

Figure 4:
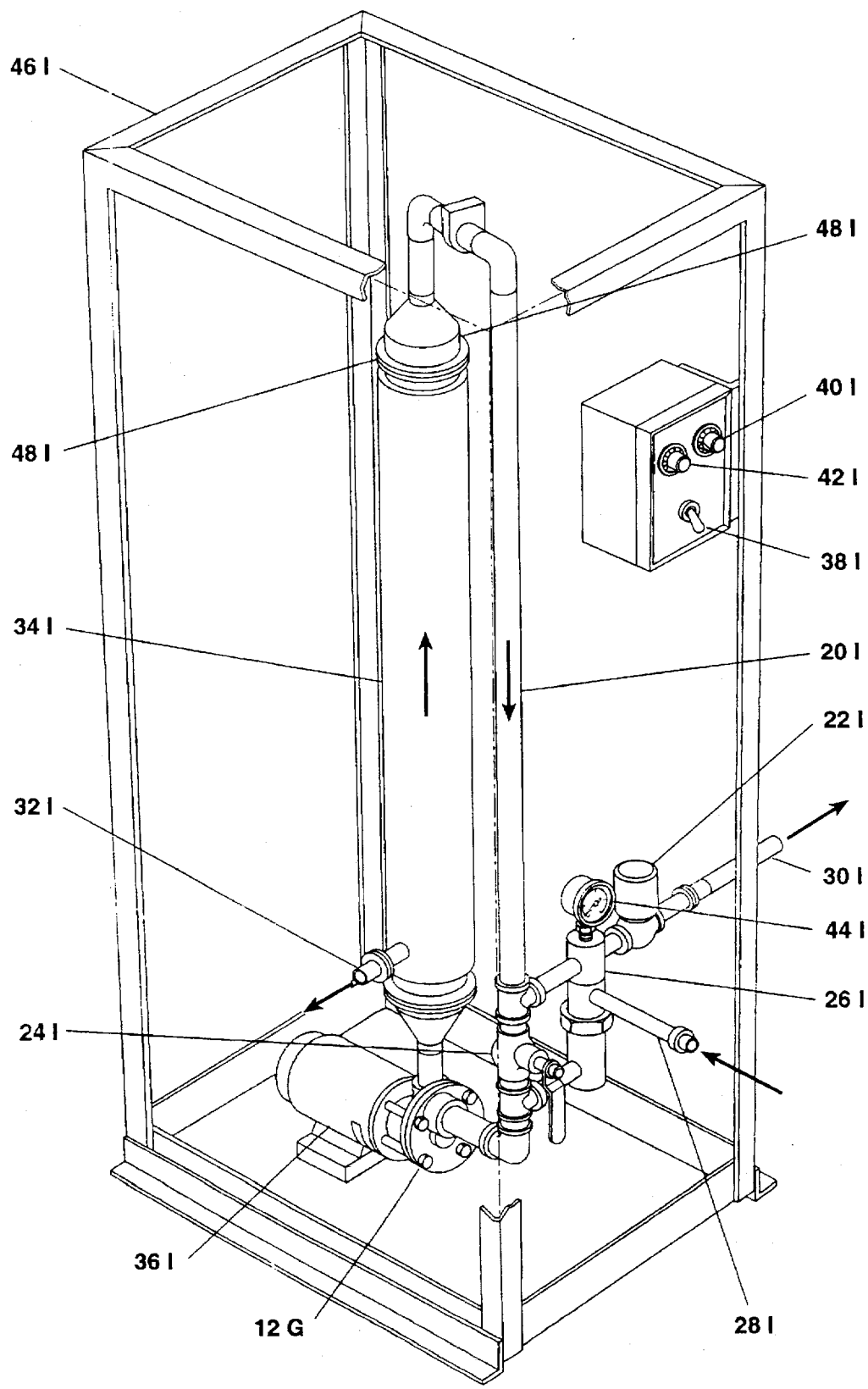
FIG. 4 is a perspective view of a typical continuous mode filtration unit of the invention.

FIG. 4 illustrates how our disclosed invention can be constructed. In this assembly a single regenerative pump 12G circulates retentate around a closed loop 20I. Within this closed loop 20I the retentate flow is divided into two components. One component flows through the venturi 26I. The remaining by-pass component flows through a manual operated flow control valve for retentate 24I. The venturi 26I continually sucks (or pulls) a liquid mixture feedstock through the port for feedstock 28I into the closed loop 20I. Chemicals or materials in the physical state of liquid, gas or small particles may be used to benefit the filtration process. These chemicals or materials can be sucked into the closed loop 20I through the port for feedstock 28I. The port for feedstock 28I is connected to the sump tank 10I as shown in FIG. 3.

Returning to FIG. 4, the filter module 34I contains the filter 14T. The concentration of the retentate is regulated by periodic blow down of retentate through the solenoid operated flow control valve for concentrate 22I. The concentrate is removed through the port for concentrate 30I. The concentrate flows to the concentrate collection tank 18I shown in FIG. 3. The permeate that passes through the filter 14T is drained through the port for permeate 32I to the permeate collection tank 16I.

FIG. 3 also shows the controls for our disclosed invention. An on-off switch 38I is used to turn on and off the single motor 36I. A timer to close solenoid valve 40I is used to regulate the time interval that the flow control valve for concentrate 22I is closed. A timer to open solenoid valve 42I is used to regulate the time the flow control valve for concentrate 22I is open. A pressure gauge 44I measures the pressure within the closed loop 20I. The pressure of the retentate within the closed loop 20I, and therefore at the filter 14T is controlled by a manual operated flow control valve for retentate 24I. All system components are supported by and contained within a steal framework 46I.

Figure 5:
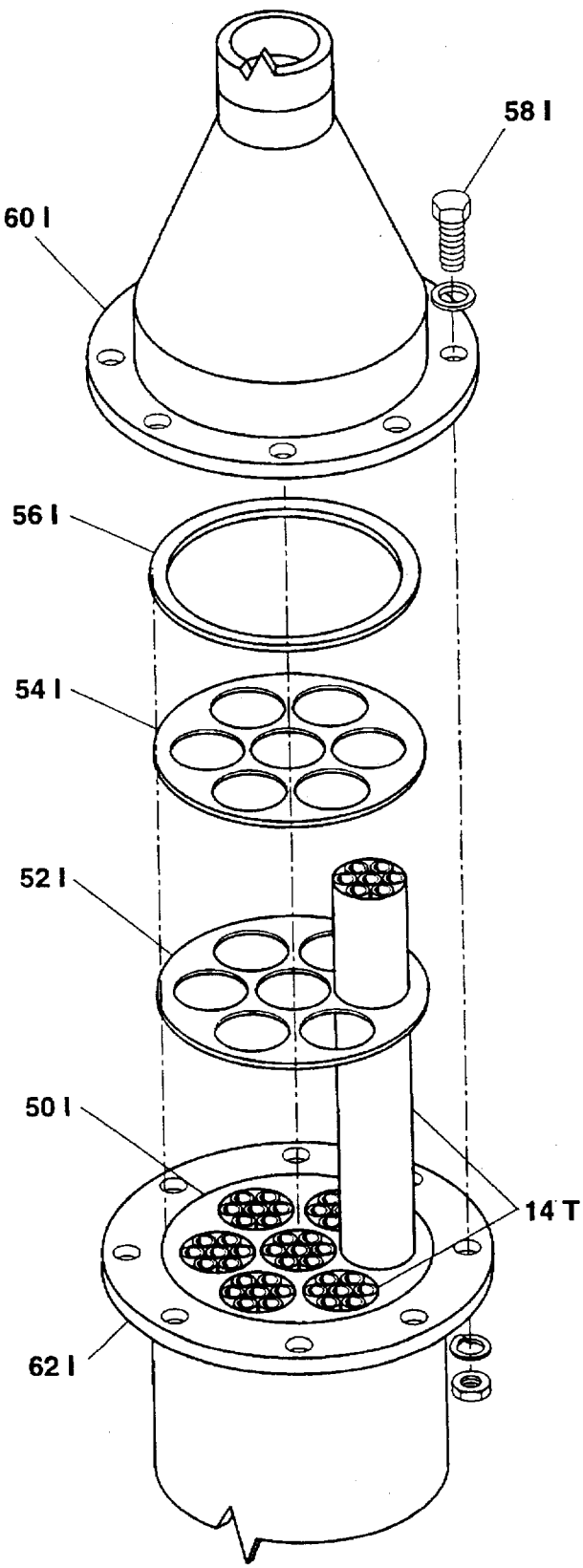
FIG. 5 is a sectional view of the internal configuration of the filter module 34I showing the filter taken along line 48I—48I.

Further details of the filter module 34I at location 48I—48I are illustrated in FIG. 5. A cross flow tubular filters 14T is held in place by an end plate 50I. A membrane gasket 52I keeps fluid from leaking around the filter 14T. A counter plate 54I and flange gasket 56I complete the list of components that are compressed together by tightening bolts 58I that connect the upper flange 60I to the lower flange 62I.

Referring to FIG. 3 and FIG. 4, when the manually operated flow control valve for retentate 24I is opened or closed, a set of varying coupled pressures and flows are created at the filter 14I (or 14T) and venturi 26I. These variables are (pressure at the venturi, flow at the venturi) and (pressure at the filter, flow at the filter).

The values of the above four variables must simultaneously satisfy operational requirements for the venturi 26I and filter 14I (or 14T). Also, stable operational conditions must be maintained in the closed loop 20I; and at the filter 14I a high permeate flow must be produced. It was not obvious to us that all conditions could be satisfied over a wide range of retentate pressures and velocities. Therefore, we built and tested a prototype system.

Tests demonstrated to us that unstable oscillations in pressure within the closed loop 20I did occur when the outflow of permeate plus concentrate exceeded the maximum inflow capability of the venturi 26I. In this case, the design limitation of the venturi 26I used in our test unit was exceeded. However, when the inflow capability of the venturi 26I was not exceeded, stable conditions always occurred in the closed loop 20I over all settings of the manual flow control valves for retentate 24I.

In practice, we always selected a venturi 26I with inflow capability that always exceeded the outflow of permeate plus concentrate. System stability was then assured under normal operating conditions.

System malfunctions, such as a bad system leak, were observed to cause outflow to exceed inflow capability of the venturi 26I. Again, unstable oscillations resulted in the closed loop 20I. We observed that a pressure gage 44I easily detect unstable pressure oscillations in our closed loop 20I. When they occurred, the motor 36I was turned off, or reduced in output to the point where system oscillations disappear.

Figure 2:
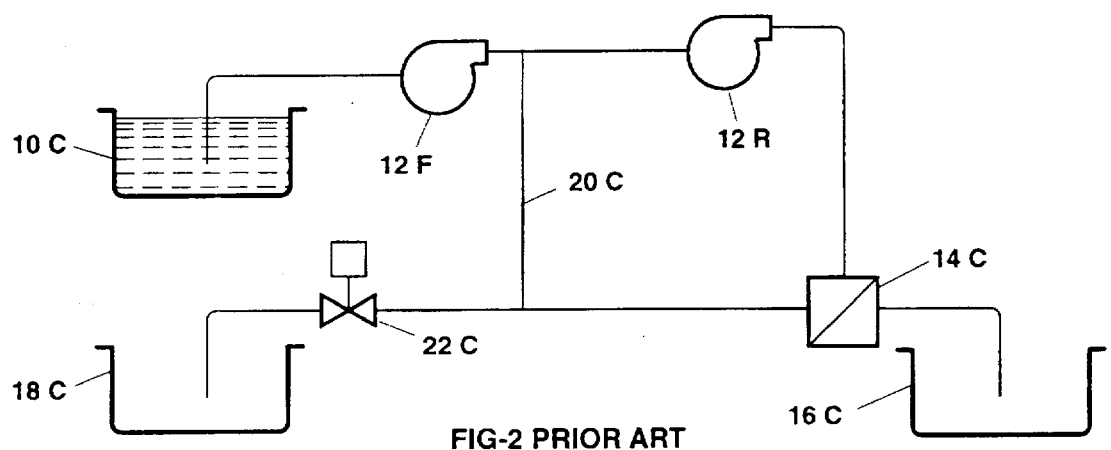
FIG. 2 is a flow diagram showing the flow of a liquid mixture through a typical continuous mode filtration unit.

We observed that our method of maintaining system stability was much easier and less expensive to implement when compared to the corresponding control problem for conventional continuous systems as shown in FIG. 2. In the conventional system, pressure within the closed loop 20C is typically monitored and two pumps coordinated and simultaneously controlled. Also, large conventional systems must use a control system to assure that spike pressures capable of damaging the filter 14C or other system components do not occur during start up. In our disclosed system, the flow control valve for retentate 24I was set fully open during start up so that most retentate passes through the flow control valve for retentate 24I rather than the venturi 26I. This configuration produced low system pressure and low permeate production. During start up steadily increasing pressure without high pressure spikes was always observed.

Filters produce permeate flow which varies in quantity as a function of flow and pressure of the retentate. In our prototype system the flow and pressure of the retentate was dependent upon the pump 12G pressure and flow characteristics, and physical constraints within the closed loop 20I. Physical constraints include piping restrictions, the position of the manual flow control valve for retentate 24I and venture 26I characteristics. After our filter and pump were selected, we selected a matching venturi 26I, flow control valve for retentate 24I, and internal piping that produced the desired range of flows and pressures of the retentate needed for high permeate flow. We then operated our filtration system with the only concern being setting the flow control valve for retentate 24I so that the pressures and flows of the retentate produced optimal permeate flow. However, pump 12G selection was critical for our system to work effectively.

Regenerative turbine pumps 12G provided a reasonable constant flow needed for cleaning the filter 14T over a wide range of operational pressures. Centrifugal pumps using corresponding horsepower were found not to provide the desired flow at elevated pressure of the retentate over a similar range of operation. We concluded that a single regenerative turbine pump was best suited for high permeate flow for a wide range of applications in microfiltration, ultrafiltration, and nanofiltration.

A regenerative turbine pump 12G was selected so that the coupled sets of pressures and flows of retentate at the filter 14T were within the desired operational range that produced maximum permeate output.

Our disclosed filtration system shown in FIG. 3 is controlled by regulating only one degree of freedom, namely a simple, inexpensive, manually operated flow control valve for retentate 24I. Existing continuous closed loop filtration systems, shown in FIG. 2, require two pumps and more complex and expensive control of the two pumps. In our disclosed system stability with high permeate flow were assured through optimum selection of the pump 12G, venturi 26I, and internal restrictions within the closed loop 20I including the flow control valve for retentate 24I.

SUMMARY

Accordingly, the reader will see that the filtration system and assembly of this invention can be used to continuously filter liquid mixtures in microfiltration, ultrafiltration and nanofiltration applications. System stability with high permeate flow result from system component specifications. Primary system components including a single pump, venturi, and manual operated flow. This invention is simpler and less expensive to operate and control when compared to similar functioning continuous systems typically in use.

We claim:

1. Apparatus for continuously separating feed fluid mixture into purified fluid mixture and residual fluid mixture, said apparatus assembled so that said residual fluid mixture is recirculated within a closed recirculating loop comprising:

a. a means to separate and remove said purified fluid mixture from said residual fluid mixture, b. means to suck(pull) said feed fluid mixture into said separating means, so that said feed fluid mixture becomes mixed with part of said residual fluid mixture, the force of said means to suck is controlled by flow of said residual fluid mixture, c. means to by-pass a portion of said residual fluid mixture around said means to suck, said by-pass having means to control said flow of residual fluid mixture controlling sucking force, and control back pressure of said residual fluid mixture upstream from said by-pass, d. single means to recirculate said residual fluid mixture, said means to recirculate located downstream of said means to suck, and downstream of said means to by-pass, e. means to remove a portion of said residual fluid mixture from said closed recirculating loop, said means to remove located downstream from said means to separate and upstream from said means to suck, wherein the rate of separation in the separation means is dependent upon said means to control back pressure upstream of said by-pass, said means to separate located downstream from said means to recirculate.

2. Apparatus of claim 1 wherein said means to suck is a venturi.

3. Apparatus of claim 1 wherein said means to control said pressure and flow of said residual fluid mixture is a control valve.

4. Apparatus of claim 1 wherein said means to recirculate maintains discharge flow virtually independent of discharge pressure.

5. Apparatus of claim 4 wherein said means to recirculate is a positive displacement pump.

6. Apparatus of claim 4 wherein said means to recirculate is a regenerative turbin pump.

7. Apparatus of claim 1 wherein said means to recirculate is a centrifugal pumps.

8. Apparatus of claim 1 wherein said means to separate is a cross flow filter.

9. Apparatus of claim 1 wherein said means to separate is a membrane.

10. Apparatus of claim 1 wherein said means to remove said residual fluid mixture from said closed recirculating loop is a control valve.

11. A process of using a control valve in a process of filtering a fluid in a system comprising a cross flow filter, a retentate closed recirculation loop, a venturi connected to an inflow of fluid to be filtered, the process comprising the steps of positioning said control valve in said recirculation loop, downstream from said cross flow filter and in parallel from said venturi; and operating the control valve to simultaneously regulate outflow from said cross flow filter and inflow to said recirculation loop through said venturi.

12. A process of using a control valve in a fluid filtration process using a system comprising a membrane, a retentate recirculation loop, and a venturi connected to the inflow of fluid to be filtered and said recirculation loop, the process comprising the steps of connecting said control valve downstream from said membrane and in parallel with the venturi in said recirculation loop connecting an inflow to said recirculation loop to said venturi, and operating said control valve to simultaneously regulate the outflow from said membrane and inflow to said closed recirculation loop through said venturi.

* * * * *